United States Patent
Heise et al.

(10) Patent No.: US 6,228,212 B1
(45) Date of Patent: May 8, 2001

(54) METHOD OF REMOVING WAX FROM CELLULOSIC FIBER USED IN A FIBER SUSPENSION FOR A PAPER-MAKING MACHINE

(75) Inventors: Oliver U. Heise, Menasha; Bangij Cao, Appleton, both of WI (US)

(73) Assignee: Voith Sultzer Paper Technology North America, Inc., Appleton, WI (US)

( * ) Notice: Subject to any disclaimer, the term of this patent is extended or adjusted under 35 U.S.C. 154(b) by 0 days.

(21) Appl. No.: 09/294,781

(22) Filed: Apr. 19, 1999

(51) Int. Cl.[7] ............................ D21B 1/08; D21C 9/08; B03D 1/14; B01D 1/00
(52) U.S. Cl. .................... 162/4; 162/55; 162/60; 162/90; 162/189; 209/164; 209/166; 210/703
(58) Field of Search .................... 162/4, 55, 60, 162/90, 189; 209/164, 166, 221.2; 210/703

(56) References Cited

U.S. PATENT DOCUMENTS

| | | | |
|---|---|---|---|
| 3,849,246 | * 11/1974 | Raymond et al. ........... | 162/4 |
| 4,399,028 | * 8/1983 | Kile et al. .................. | 209/164 |
| 5,302,245 | * 4/1994 | Nadeau ...................... | 162/8 |
| 5,316,621 | * 5/1994 | Kitao et al. ................. | 162/4 |
| 5,679,221 | * 10/1997 | Foster et al. ................ | 162/190 |
| 5,707,489 | * 1/1998 | Von Grumbkow et al. ..... | 162/4 |
| 5,755,926 | * 5/1998 | Hankins et al. .............. | 162/6 |
| 5,865,947 | * 2/1999 | Markham et al . ........... | 162/5 |
| 6,053,439 | 4/2000 | Locke et al. ................. | 241/20 |

FOREIGN PATENT DOCUMENTS

| | | |
|---|---|---|
| 4024561 | * 8/1990 | (DE) . |
| 0 632 158 A1 | 6/1994 | (EP) .............. D21C/5/02 |

* cited by examiner

Primary Examiner—Stanley S. Silverman
Assistant Examiner—Dionne A. Walls
(74) Attorney, Agent, or Firm—Taylor & Aust, P.C.

(57) ABSTRACT

The invention comprises, in one form thereof, a method of removing wax from recycled cellulosic fiber. The cellulosic fiber is pulped in a pulper to a suspension with a consistency of less than about 10% by weight. The suspension is then screened to remove coarse and fine contaminants. The screened suspension is diluted to a consistency of less than about 3% by weight. The wax is removed from the diluted suspension using a froth flotation device. The suspension is then washed and/or thickened.

6 Claims, 1 Drawing Sheet

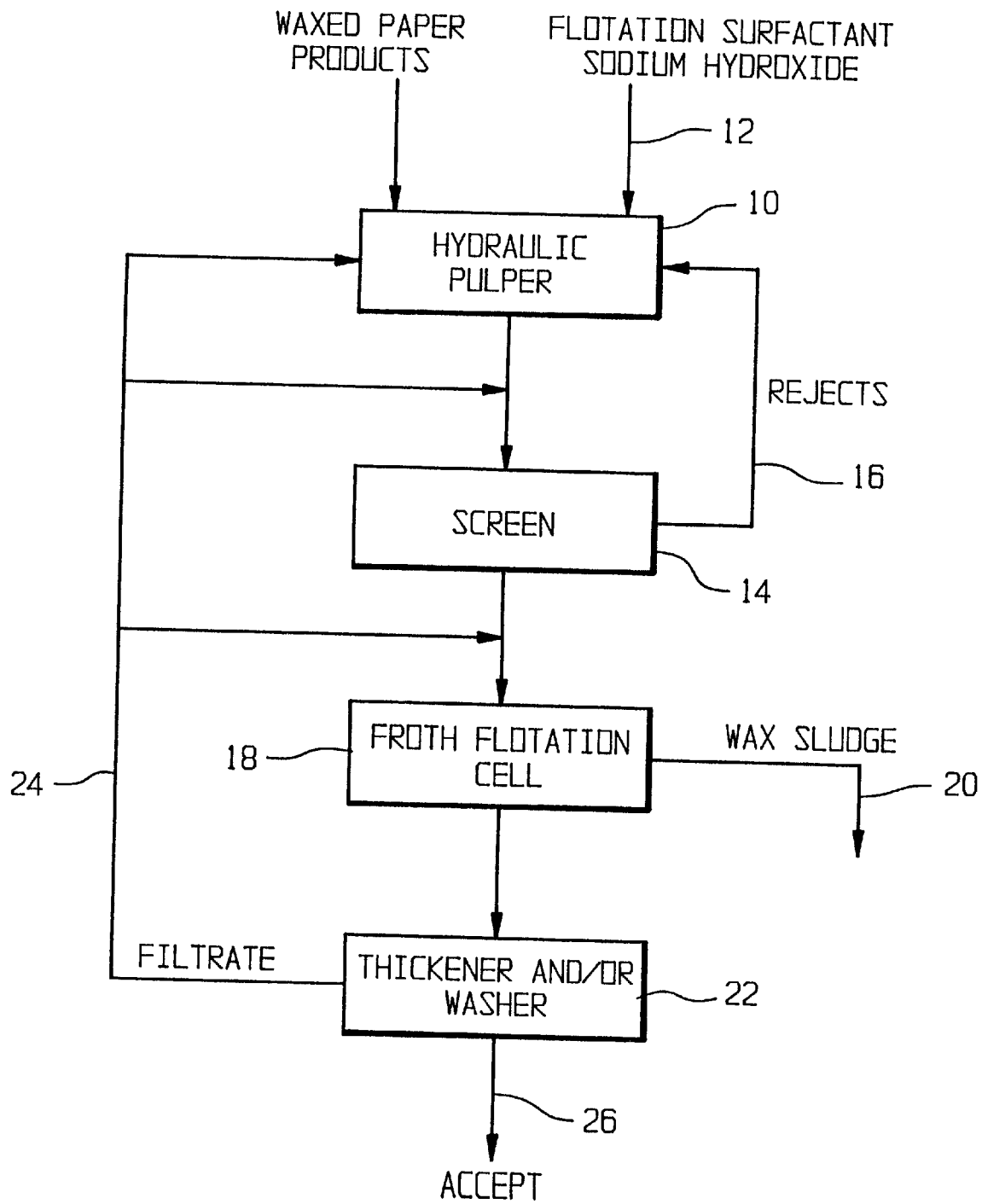

METHOD OF REMOVING WAX FROM CELLULOSIC FIBER USED IN A FIBER SUSPENSION FOR A PAPER-MAKING MACHINE

BACKGROUND OF THE INVENTION

1. Field of the Invention

The present invention relates to a method of making a fiber suspension for use in a paper-making machine, and, more particularly, to a method of removing wax from recycled cellulosic fiber used to make such a fiber suspension.

2. Description of the Related Art

Petroleum waxes have long been used in the paper converting industry to provide cellulosic paper products moisture resistance and wet strength. These paper products include corrugated boxes, paper cups, waxed paper wrapper, and waxed roll-wrap laminates. Of these products, corrugated boxes account for the majority of wax consumed. When wax is applied to corrugated boxes, the main objective is to provide board structural integrity in humid and wet environments.

The majority of wax used with corrugated board is petroleum wax, a by-product of the automotive lubricating oil refining process. In this process, crude oil is distilled (separated by boiling) into various products such as gasoline, naptha, fuel oil, gas oil, and paraffin distillates. Paraffin wax is the solid component of the paraffinic distillate. Paraffin wax is a crystalline structured polymer composed primarily of a mixture of hydrocarbon molecules. Solid paraffin waxes are usually white, translucent, tasteless, and odorless. They are hard, relatively brittle, and have a slightly greasy feel. In a molten state, paraffin waxes are clear, colorless liquids of low viscosity. The melting point of paraffin waxes ranges from 43–71° C. Blended wax is a combination of paraffin with or without other waxes usually in conjunction with non-wax additives such as resins, rosins, polymers, and copolymers.

There are currently three methods to apply wax to corrugated paperboard.
a) Impregnating The material is dipped or submerged into a bath of molten wax. The paper board will pick up 10–20% of its weight in wax. The wax is usually a food grade paraffin of low viscosity. If only one component is treated, it is almost always the medium.
b) Saturating or Cascading A thick "waterfall" of wax is flushed into or over the finished board, or the board is dipped in a bath of molten wax. The board will pick up 35–50% of its weight in wax. The wax is usually a simple, medium viscosity blend of fully refined paraffin and additive.
c) Curtain Coating The material is passed horizontally through a thin curtain of falling wax. The board will pick up 5–7 lb of wax per thousand square feet of board. The wax is usually a complex blend of fully refined paraffin and several additives, resulting in a very high viscosity product.

Waxed old corrugated container (OCC), entering through the collection process, is the largest source of wax contamination in paper recycling mills. These waxes present a major obstacle to the paper recycling industry. The problems with wax for paper-making are as follows:
  a) Presence of wax in a paper sheet results in the reduction of the coefficient of friction, which in turn causes troubles in rewinding, converting, and box stacking.
  b) Waxes tend to deposit on the surface of fibers, thus lowering the interfiber bonding strength. The paper and board made from such fibers possess lower strength properties when the amount of wax in the paper and board reaches 0.5%. Also, there is some loss in stiffness.
  c) Paper and board containing wax generally have poor printability and glueability.
  d) Non-dispersed waxes (such curtain coating) introduce unpleasant spots in paper sheets during drying.
  e) Occasionally waxes can aggravate a pitch problem. Wax tend soften the pitch, thus making it more tacky.
  f) Low-viscosity waxes (used for cascading or impregnating processes) are easily dispersed during pulping at elevated temperatures. The dispersed waxes are such fine particles that conventional mechanical separation equipment, such as screen and cleaner, are not effective in removing these contaminants.
  g) Wax removal by washing requires water clarification since wax is not removed from the liquid phase. Wax build-up in white water is not acceptable in paper mills. In addition, washing is not effective in removing large particle wax.

Because of the above-mentioned troubles with waxes, waxed OCC and other waxed paper products have been classified as non-recyclable. As such, waxed OCC is generally sorted out at the recycling plant and incinerated or land filled.

What is needed in the art is a method of removing wax from a fiber suspension made from waxed cellulosic fiber, such as waxed OCC.

SUMMARY OF THE INVENTION

The present invention provides a method of effectively and economically removing wax from recycled cellulosic fiber used in a fiber suspension for a paper-making machine.

The invention comprises, in one form thereof, a method of removing wax from recycled cellulosic fiber. The cellulosic fiber is pulped in a pulper to a suspension with a consistency of less than about 10% by weight. The suspension is then screened to remove coarse and fine contaminants. The screened suspension is diluted to a consistency of less than about 3% by weight. The wax is removed from the diluted suspension using a froth flotation device. The suspension is then washed and/or thickened.

An advantage of the present invention is that wax is effectively removed from the recycled cellulosic fiber used in the fiber suspension.

Another advantage is that wax coated recycled cellulosic fiber which was heretofore very difficult or impossible to reuse can be recycled and used with the method of the present invention.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawing, which is a flow chart illustrating an embodiment of the method of the present invention. The exemplification set out herein illustrates one preferred embodiment of the invention, in one form, and such exemplification is not to be construed as limiting the scope of the invention in any manner.

DETAILED DESCRIPTION OF THE INVENTION

Referring now to the drawing, there is shown a flow chart illustrating an embodiment of the method of the present invention for removing wax from recycled cellulosic fiber for use in a paper-making machine.

The recycled cellulosic fiber having wax thereon, such as OCC, is introduced into a hydraulic pulper (block 10). The waxed coated cellulosic fiber is combined with water in the hydraulic pulper and substantially broken down into the individual cellulosic fibers, as well as some other undesirable fiber flakes, coarse contaminants and fine contaminants. The water and cellulosic fiber are combined within the hydraulic pulper such that the fiber suspension has a consistency of less than about 10% by weight, and more preferably between about 4 and 8% by weight.

To further improve the pulping of the wax covered cellulosic fiber within the hydraulic pulper, the pH of the suspension within the hydraulic pulper is controlled to be between about 9.5 and 10.5. The pH may be controlled, e.g., by adding sodium hydroxide to the hydraulic pulper (line 12).

In addition, the temperature of the fiber suspension within the hydraulic pulper and the processing time within the hydraulic pulper are also controlled to improve the pulping of the wax coated cellulosic fiber. In the embodiment shown, the internal temperature of the pulper is controlled to be between about 50 and 70° C. Additionally, the processing time for the fiber suspension within the hydraulic pulper is controlled to be between about 20 and 50 minutes.

To help remove the wax from the wax coated cellulosic fiber, a surfactant is added to the hydraulic pulper (line 12). The surfactant may be added at a rate of between about 0.01 and 0.5% based upon a weight percentage of the cellulosic fiber. If the cellulosic fiber includes a larger amount of wax, such as the cascade coated OCC with as much as 30% wax, then the higher amount of surfactant is used within the hydraulic pulper.

After the cellulosic fiber is pulped within the hydraulic pulper, the pulped fiber suspension is screened within a screening machine providing both coarse screening and fine screening (block 14). The coarse screening and fine screening operations within the screening machine remove the undefibered fiber flakes and other contaminants (such as hot melts, plastics, stickies and styrofoam) within the fiber suspension which is discharged from the hydraulic pulper. The coarse screening operation removes larger contaminants and the fine screening operation removes smaller contaminants from the fiber suspension. The rejects from the screening machine may contain wax. Accordingly, the rejects are returned to the hydraulic pulper, indicated by line 16. Approximately 1% of the wax within the fiber suspension is removed using the screening machine.

After the screening operation, the screened fiber suspension is introduced into a froth flotation device, such as a froth flotation cell (block 18). A surfactant may also optionally be added to the screened fiber suspension prior to introduction into the froth flotation cell. The fiber suspension is diluted either prior to or within the froth flotation cell to a consistency of less than about 3% by weight, and more preferably to a consistency of between about 0.2 and 2% by weight. The pH and temperature of the diluted fiber suspension are controlled within the froth flotation device to provide optimum flotation and wax removal. In the embodiment shown, the pH of the diluted fiber suspension is controlled to be between about 8.5 and 9.5. For example, sodium hydroxide may be added to the diluted fiber suspension to control the pH thereof. Moreover, in the embodiment shown, the internal temperature of the froth flotation device is controlled to be between about 80 and 160° F. Air is introduced into the diluted fiber suspension in the froth flotation device at a range of between about 40 and 200% air-to-stock ratio, and more preferably between about 40 and 60% air-to-stock-ratio, to generate foam which carries wax to the surface of the diluted fiber suspension. The foam with the wax entrained therein is removed from the froth flotation device (line 20). The wax foam can either be further processed to recover wax or sent to sewage.

After the froth flotation operation within the froth flotation device, the fiber suspension is thickened and/or washed and sent to other unit operation to further remove non-wax contaminants (block 22). The thickened and/or washed fiber suspension contains below about 1% wax based upon the weight of oven-dry solids. The thickener can be, e.g., a conventional gravity thickener. The washer can be, e.g., a conventional disc filter washer. The filtrate from the thickener and/or washer contains only a very small amount of wax (below 0.01%), and may be directly reused as dilution water for the pulping, screening and flotation operations (line 24). The accept from the thickener and/or washer (line 26) may be used as a fiber suspension in a paper-making machine.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of removing wax from recycled cellulosic fiber, comprising the steps of:

pulping the cellulosic fiber in a pulper to a suspension with a consistency of less than about 10% by weight;

screening the suspension to remove contaminants;

diluting the screened suspension to a consistency of less than about 3% by weight, said diluting step including diluting the suspension to a consistency of between about 0.2 and 2.0% by weight;

removing wax from the diluted suspension using a froth flotation device, said wax removing step including the substeps of:

controlling the pH of the suspension to between about 8.5 and 9.5;

controlling an internal temperature of the froth flotation device to between about 85 and 160° F.;

introducing air into the suspension at a range of between about 40 and 200% air-to-stock ratio to generate foam which carries wax to the surface of the suspension; and removing the foam with entrained wax therein from the froth flotation device; and adjusting the consistency of the suspension after said wax removing step.

2. The method of claim 1, wherein said contaminants removed during said screening step are returned to said pulper.

3. The method of claim 1, wherein the foam is further processed after said foam removing substep.

4. The method of claim 1, wherein a filtrate is generated in said adjusting step, said filtrate being reused as dilution water for at least one of pulping, screening and flotation.

5. A method of removing wax from recycled cellulosic fiber, comprising the steps of:

pulping the cellulosic fiber in a pulper to a suspension with a consistency of less than about 10% by weight, said pulping step comprising the substeps of:

diluting the cellulosic fiber to a consistency of between about 4 and 8% by weight;

adjusting the pH of the suspension to between about 9.5 and 10.5;

adjusting an internal temperature of the pulper to between about 50 and 70 deg C.; and processing the suspension for a time period of between about 20 and 50 minutes in said pulper;

screening the suspension to remove contaminants;

diluting the screened suspension to a consistency of less than about 3% by weight, said diluting step including diluting the suspension to a consistency of between about 0.2 and 2.0% by weight;

removing wax from the diluted suspension using a froth flotation device, said wax removing step including the substeps of:

adjusting the pH of the suspension to between about 8.5 and 9.5;

adjusting an internal temperature of the froth flotation device to between about 85 and 160 deg F.;

introducing air into the suspension at a range of between about 40 and 200% air-to-stock ratio to generate foam which carries wax to the surface of the suspension; and removing the foam with entrained wax from the froth flotation device; and further processing the suspension using at least one of a thickener and washer.

6. The method of claim 5, wherein sodium hydroxide is added to the froth flotation device.

\* \* \* \* \*